(12) United States Patent  
Menkhus

(10) Patent No.: US 9,220,983 B1  
(45) Date of Patent: Dec. 29, 2015

(54) SYSTEM AND METHOD FOR PEER COMPETITIVE GAMING

(71) Applicant: Liger Sports, LLC, Tempe, AZ (US)

(72) Inventor: Eric Menkhus, Tempe, AZ (US)

(73) Assignee: Liger Sports, LLC, Tempe, AZ (US)

( * ) Notice: Subject to any disclaimer, the term of this patent is extended or adjusted under 35 U.S.C. 154(b) by 121 days.

(21) Appl. No.: 14/017,905

(22) Filed: Sep. 4, 2013

Related U.S. Application Data

(60) Provisional application No. 61/696,515, filed on Sep. 4, 2012.

(51) Int. Cl.
*A63F 13/12* (2006.01)
*A63F 13/30* (2014.01)

(52) U.S. Cl.
CPC ..................... *A63F 13/12* (2013.01)

(58) Field of Classification Search
USPC ..................................... 463/25, 42
See application file for complete search history.

(56) References Cited

U.S. PATENT DOCUMENTS

| | | |
|---|---|---|
| 6,758,754 B1 | 7/2004 | Lavanchy et al. |
| 2005/0209717 A1 | 9/2005 | Flint et al. |
| 2009/0270177 A1 | 10/2009 | Rohlffs |
| 2010/0094773 A1* | 4/2010 | Simpson ................ 705/36 R |
| 2015/0018988 A1* | 1/2015 | Safar ......................... 700/91 |

OTHER PUBLICATIONS http://www/standordaily.com/2011/08/11/taylor-fantasy-leagues-should-bridge-multiple-sports/.

* cited by examiner

*Primary Examiner* — Pierre E Elisca
(74) *Attorney, Agent, or Firm* — Booth Udall Fuller, PLC

(57) ABSTRACT

A computerized method of peer competitive gaming comprising receiving by a processor a league duration timeframe from a computerized commissioner device and selections of first and second pluralities of non-uniform data sets from first and second computerized user devices in addition to data corresponding to the pluralities of user-selected non-uniform data sets from one or more data sources. The method further comprises calculating, one or more statistical values for each user-selected non-uniform data set received from the one or more data sources and a manipulated scoring component value using the one or more statistical values and the data received from the one or more data sources for each user-selected non-uniform data set. The calculated manipulated scoring component values for each user are summed to form a total manipulated scoring value for each user and ranked among the users.

20 Claims, 5 Drawing Sheets

SYSTEM AND METHOD FOR PEER COMPETITIVE GAMING

CROSS REFERENCE TO RELATED APPLICATIONS

This document claims the benefit of the filing date of U.S. Provisional Patent Application No. 61/696,515, entitled "System and Method for Peer Competitive Gaming" to Eric Menkhus, which was filed on Sep. 4, 2012, the disclosure of which is hereby incorporated entirely by reference herein.

BACKGROUND

1. Field of the Invention

The invention relates generally to the field of cross-segment and cross-market competitive gaming.

2. Description of Related Art

With the introduction of Communication on the Move (COTM) or Communications on the Pause (COTP) systems, commonly referred to as mobile terminal(s), there is a growing need and great concern to control the level of interference caused by small aperture antennas. Additionally, small-aperture static terminals exhibit the same interference issues, so both a mobile and a static terminal will generically be referred to as "terminals." Interference that may be caused by the terminals may be in the form of Adjacent Satellite Interference (ASI), where the terminal's small aperture antenna produces a wide beam width resulting in adjacent satellites being illuminated, thereby resulting in interference to services on adjacent satellites. Larger antennas produce narrower beam widths, but they are generally used less in mobile or nomadic applications. Fantasy sporting leagues have a decades-long history in the United States, and in recent years have only grown more popular, with the Fantasy Sports Trade Association estimating that, as of 2012, 35 million American adults have played a fantasy sports game. Fantasy gaming is, however, not limited to sports and has entered areas such as finance, politics, and film actors. Although fantasy games may be based on different underlying markets or segments, what all fantasy games have in common is that they allow gamers to choose hypothetical teams of professional, famous, or other people and pit these teams against teams created by other players in which the scores to determine the winner are calculated from statistical compilations of real-world data.

As illustrated with the example of the most popular fantasy sporting game in the United States, fantasy football, participants act as if they were football team owners and build a team, by drafting and trading players, that competes against teams created by other participants where scores are calculated based on statistics generated by real-world professional football players. Various methods exist to calculate scores generated from the real-world statistics which have become increasingly complex as computer-based systems have become more prevalent.

Initial score calculation relies on simple tabulations such as calculating the number of touchdowns and field goals an individual football player scores, and then each participant receives corresponding points based on if that individual player was on his team or not. The winner each week is determined by which participant has the team with the highest combined points scored from the individual players on his or her team. These score calculations are simple enough that the league commissioner, who has compile a weekly tabulation of each user's score, may calculate the points associated with each player without assistance from a complex computer system.

However, with the assistance of computer-based systems, broader statistical analyses can be done that incorporates a larger range of statistics associated with individual players and adds an element of "realness" that better simulates how the players might actually perform on teams comprised of the participants' choosing. This creates a more satisfying fantasy football experience. Statistics in fantasy football that may be incorporated by a computer-based system, for example, are the number of yards gained (through rushing or passing), sacks, interceptions, field goals, tackles, injuries, and the like. To use another example, fantasy baseball may include statistics such as RBIs, errors, stolen bases, home-field advantage, ERA, hits, on-bases, strikes, batting average, and the like.

The fantasy sports games that exist in the prior art have several drawbacks including the lack of user customization and the inability to combine players or statistics from different segments and/or markets.

So as to reduce the complexity and length of the Detailed Specification, and to fully establish the state of the art in certain areas of technology, Applicant herein expressly incorporates by reference all of the following materials identified in each numbered paragraph below.

U.S. Publication No. 2009/0270177 represents one attempt at establishing a fantasy football game system using a networked computer system. This application's significant disclosure relates to calculating a fantasy football score with placekickers eliminated from the statistical calculation based on placekickers' unique relationship to the rest of the football team.

U.S. Publication No. 2005/0209717 discloses a computerized system for generating and comparing competition data such as skill levels of competitors competing in a single or multiple sports leagues. The system relies on normalization of competition data to determine the relative skill level of similarly ranked player in multiple leagues. For example, the winner of one tennis league may be compared to the winner of a different tennis league to determine which player is actually the most skilled.

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant will amend the specification to expressly recite the essential material that is incorporated by reference as allowed by the applicable rules.

SUMMARY

In some implementations, a computerized method of peer competitive gaming may comprise receiving, by a processor, a league duration timeframe from a computerized commissioner device, a selection of a first plurality of non-uniform data sets from a first computerized user device and a second plurality of non-uniform data sets from a second computerized user device, and data corresponding to the first and second pluralities of user-selected non-uniform data sets from one or more data sources. The method may further comprise calculating, by the processor, one or more statistical values for each user-selected non-uniform data set received from the one or more data sources and a manipulated scoring component value using the one or more statistical values and the data received from the one or more data sources for each user-selected non-uniform data set. The method may further comprise summing, by the processor, the calculated manipulated scoring component values for each user to form a total manipulated scoring value for each user, and ranking, by the processor, the total manipulated scoring values for the first and second users relative to each other.

Particular aspects may comprise one or more of the following features. At least one non-uniform data set among the first and second pluralities of non-uniform data sets may comprise historical data. At least one non-uniform data set among the first and second pluralities of non-uniform data sets may comprise data collected over the league duration timeframe. The method may further comprise receiving by the processor, a weighting factor corresponding to at least one calculated manipulated scoring component value and summing the calculated manipulated scoring component values after applying weighting factor to the calculated manipulated scoring component value. At least one of the non-uniform data sets among the first and second pluralities of non-uniform data sets may comprise data relating to at least one of a sports player's performance, a sports team's performance, sales data, entertainment data, political data, and financial market data. The one or more statistical values may comprise a mean and a standard deviation. The one or more statistical values may comprise a mean and a span between a maximum and minimum value for a non-uniform data set. The weighting factor may be received from the first or the second user device. The method may further comprise receiving by the processor a type of statistical manipulation from the computerized commissioner device. The weighting factor may be based on a total number of manipulated scoring value components designated as active by the first or second user.

Implementations of a system for computerized peer competitive gaming may comprise a computerized commissioner device configured to transmit a league duration timeframe to a processor, a first computerized user device configured to transmit a selection of a first plurality of non-uniform data sets to the processor, and a second computerized user device configured to transmit a second plurality of non-uniform data sets to the processor. The processor may be configured to receive data corresponding to the first and second pluralities of user-selected non-uniform data sets from one or more data sources, calculate one or more statistical values for each user-selected non-uniform data set received from the one or more data sources, calculate a manipulated scoring component value using the one or more statistical values and the data received from the one or more data sources for each user-selected non-uniform data set, sum the calculated manipulated scoring component values for each user to form a total manipulated scoring value for each user, and rank the total manipulated scoring values for the first and second users relative to each other.

Particular aspects may comprise one or more of the following features. At least one non-uniform data set among the first and second pluralities of non-uniform data sets may comprise historical data. At least one non-uniform data set among the first and second pluralities of non-uniform data sets may comprise data collected over the league duration timeframe. The processor may be further configured to receive a weighting factor corresponding to at least one calculated manipulated scoring component value and sum the calculated manipulated scoring component values after applying the weighting factor to the calculated manipulated scoring component. At least one of the non-uniform data sets among the first and second pluralities of non-uniform data sets may comprise data relating to at least one of a sports player's performance, a sports team's performance, sales data, entertainment data, political data, and financial market data. The one or more statistical values may comprise a mean and a standard deviation. The one or more statistical values may comprise a mean and a span between a maximum and minimum value for a non-uniform data set. The weighting factor may be received from the first or the second user device. A type of statistical manipulation may be received from the computerized commissioner device. The weighting factor may be based on a total number of manipulated scoring value components designated as active by the first or second user.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of pre-AIA 35 U.S.C. §112, ¶6 and post-AIA 35 U.S.C. §112(f). Thus, the use of the words "function," "means" or "step" in the Detailed Description or Description of the Drawings or claims is not intended to somehow indicate a desire to invoke the special provisions of pre-AIA 35 U.S.C. §112, ¶6 or post-AIA 35 U.S.C. §112 (f), to define the invention. To the contrary, if the provisions of pre-AIA 35 U.S.C. §112, ¶6 or post-AIA 35 U.S.C. §112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of pre-AIA 35 U.S.C. §112, ¶6 or post-AIA 35 U.S.C. §112(f). Moreover, even if the provisions of pre-AIA 35 U.S.C. §112, ¶6 or post-AIA 35 U.S.C. §112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

Figure 1:
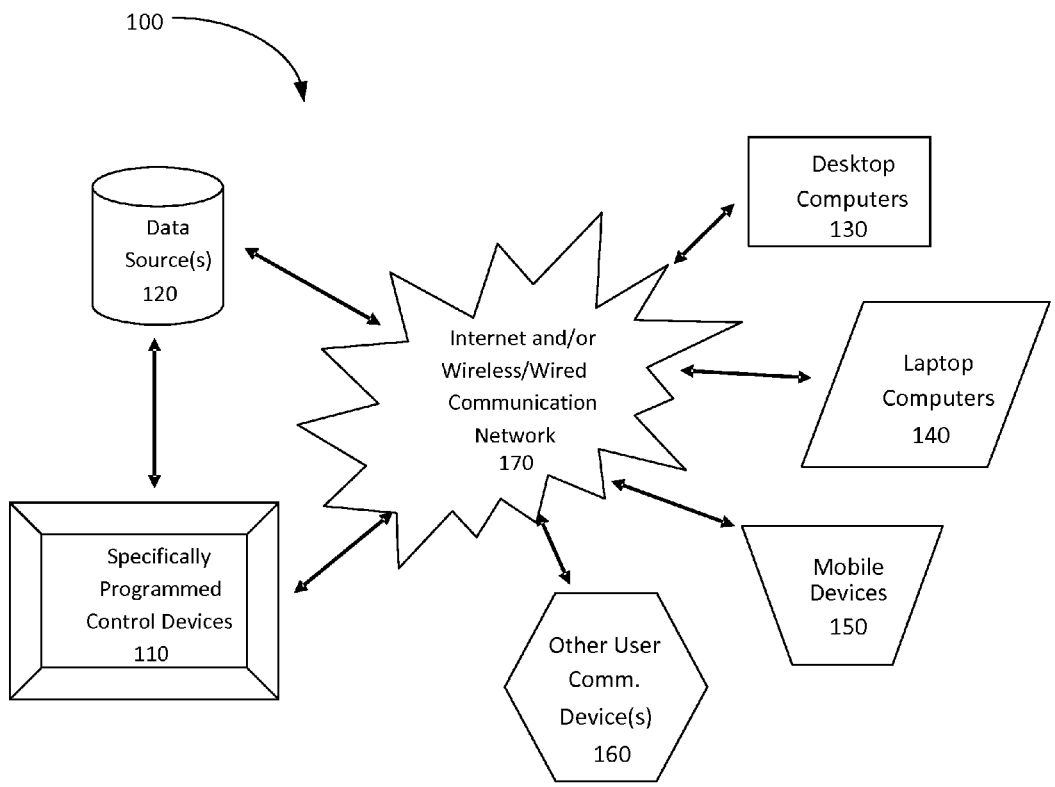
FIG. 1 depicts an example of an implementation of a networked system for peer competitive gaming.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Current fantasy sports leagues and similar gaming systems lack the ability to allow players to compete with other players whose interests differ from their own. For example, one user may be interested in football and basketball while another user has no knowledge of these sports, but is highly interested in movies and the financial markets. Using conventional competitive gaming systems, these two players are unable to compete against each other as the prior art does not provide any mechanism by which each player can select and customize the data parameters and arithmetic or statistical manipulations of the system to allow a meaningful comparison of non-uniform data sets pertaining to different types of data. Implementations of the disclosed system and methods are directed to a cross-market or intra-market gaming system that allows users of the system to compete among each other regardless of whether their interests or competitive selections are directed to the same types or sets of data thereby allowing players with dissimilar interests to compete against each other in a single league or contest.

In one application of the invention, a customizable, cross-market gaming system 100 comprised of computerized devices such as specifically programmed control devices (SPCDs) or other computerized processors 110, computerized data sources 120 such as third party data sources (TP-DSs), and computerized user communication devices (UCDs) 130, 140, 150, 160 are in communication via a network 170 that allows communication between the devices. While one of ordinary skill in the art would recognize that any suitable computerized devices may be used, examples of computerized user communication devices may include, but are not limited to desktop computers 130, laptop computers 140, mobile devices 150 (for example, smart phones, cell phones, tablet computers, PDAs, personal gaming systems, or the like), and any other computerized device capable of network communications 160. The customizable, cross-market gaming system facilitates or controls many activities including, but not limited to: data retrieval, statistical analysis of data, offers of leagues and contests, and user customization. Users may customize various parameters and inputs related to leagues, contests, statistics (including choosing how points are derived from statistical inputs), communication methods, data inputs, data retrieval frequency, and the like, as one having ordinary skill in the art would recognize from this disclosure.

One aspect of the present invention provides gaming opportunities in which users may select groups of competitors that comprise teams or other groupings of user-selected competitors across multiple segments and markets. These segments and markets span, but are not limited to, sports, entertainment, finance, politics, and any market in which multiple individuals, groups of individuals, or entities may compete with each other.

Implementations of the disclosed system may be orchestrated by any suitable computerized processor(s), referred to here as SPCD(s) 110. These SPCDs 110 may control any attributes of implementations of the system such as, by non-limiting example, the timing and details of the system's accessing of data, statistical manipulation of the accessed data, input parameters and requests from users, and data outputs and parameter requests communicated to users via users' various computerized communication devices.

One of ordinary skill in the art will recognize that the methods of the present invention may be implemented as one or more software processes executable by one or more processors and/or one or more firmware applications. The processes and/or firmware are configured to operate on one or more general purpose microprocessors or controllers, a field programmable gate array (FPGA), an application specific integrated circuit (ASIC), or other hardware capable of performing the actions describe above. In an exemplary embodiment of the present invention, software processes are executed by a CPU in order to perform the actions of the present invention. Additionally, the present invention is not described with reference to any particular programming language. It will be appreciated that a variety of programming languages may be used to implement the teachings of the invention as described herein.

It is also to be understood that the methods may be employed with any form of memory device including all forms of sequential, pseudo-random, and random access storage devices. Storage devices as known within the current art include all forms of random access memory, magnetic and optical tape, magnetic and optical disks, along with various other forms of solid-state mass storage devices. The current invention applies to all forms and manners of memory devices including, but not limited to, storage devices utilizing magnetic, optical, and chemical techniques, or any combination thereof.

Figure 2:
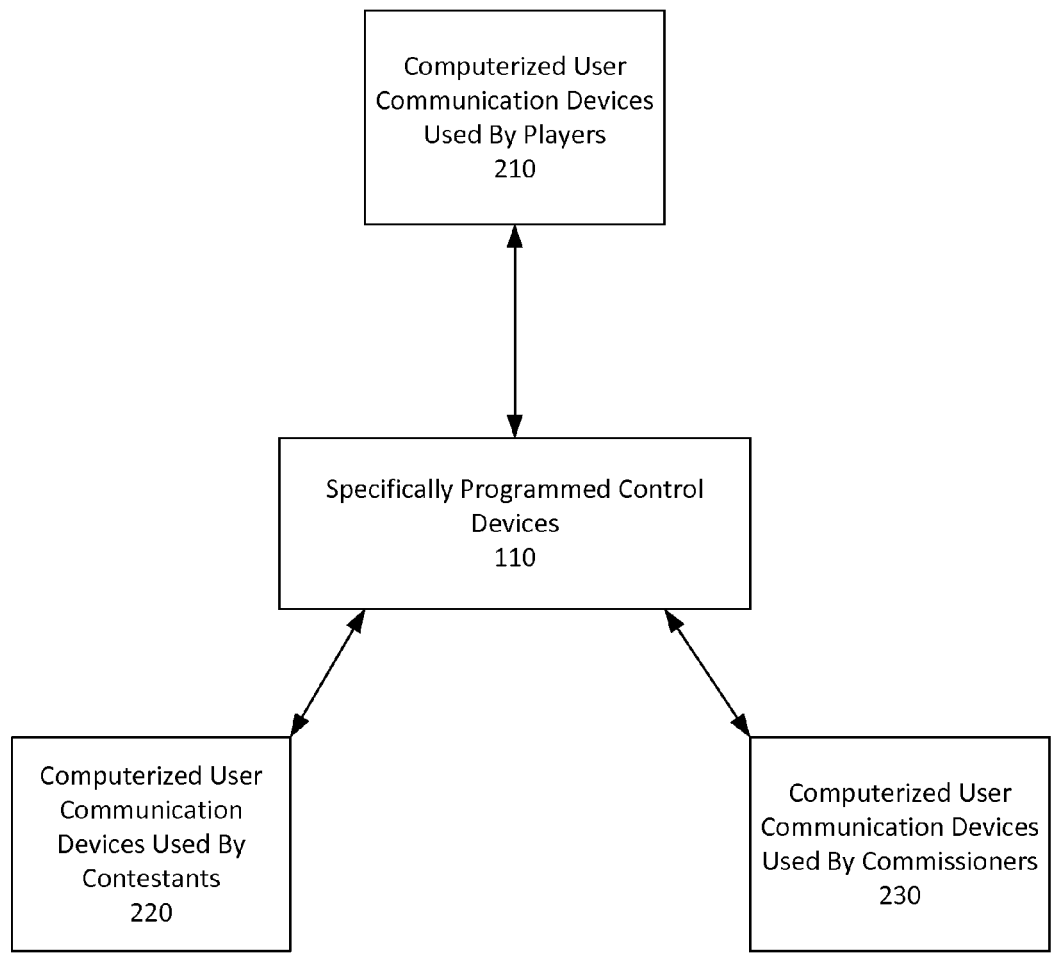
FIG. 2 provides an example of types of user devices that may interact with a Specifically Programmed Control Device (SPCD) in an implementation of the disclosed system and method.

As shown in FIG. 2, users of implementations of the disclosed system and methods that interact with SPCDs 110 may include, but are not limited to, users participating in leagues ("players"), users participating in contests ("contestants"), and users that create and choose the format for leagues or contests ("commissioners") in which they and others may participate. These users access and interact with the SPCDs 110 using computerized user devices 210, 220, 230. In some embodiments, users who are league or contest commissioners may also participate in the league or contest by communicating with the SPCDs 110 via their computerized user devices 230.

In some implementations, a league may be a fantasy sports game or other contest involving cross-market non-uniform data sets in which any number of users compete against each other with a resulting comparison of final scores at the end in which a prize having monetary or other tangible value or any other form of recognition may optionally be awarded by one or more system or league administrators. For example, users in a single league could compete in a fantasy sports game or other contest involving non-uniform data sets from multiple sports or alternatively, the league or contest could involve non-uniform data sets from other non-sports fields such as for example, financial markets or entertainment. A league or contest may involve non-uniform data sets from multiple sports, non-sports fields or markets, or any combination thereof.

When accessing the SPCDs using their computerized user communication devices, users may create accounts, input personal information, create customized leagues, choose standardized leagues offered on the system, research individualized statistical data, research aggregated statistical data, join leagues, join contests, draft teams, make trades, communicate with other users, communicate with system administrators who administer the SPCDs, and generally perform other tasks and activities associated with creating, participating in, or researching data associated with leagues and contests.

Conversely, SPCDs may initiate one or more prompts for information or parameters to be input by users via the users' computerized user devices. Additionally, the user devices may also display real time, historical, and/or summarized data received from SPCDs and communicate user commands or requests to the SPCDs via one or more wired or wireless communication networks.

To facilitate user research, user participation, and system functions, SPCDs may communicate and interact with one or more data sources which may be proprietary or provided by a third party via the communication network. In some implementations, SPCDs may upload data from sports, entertainment, financial, or other data sources on ad hoc, periodic, or combined bases. The data sets received from the data sources may be uniformly formatted or configured or may be non-uniform and vary depending on the nature and content of the data. For example, data relating to sports information may comprise different data fields, categories, time durations, etc. than data relating to financial markets, entertainment, or any other appropriate type of data. Once the data is downloaded from the data source to the SPCDs' designated storage location(s), the SPCDs may perform statistical analyses on the data, present the data or the analyses of the data to users by displaying the data or analyses on one or more computerized user communication devices, store the data for future use, perform a combination of these activities, or perform a myriad other functions on or with the data retrieved from the one or more data sources.

The timing of access to data sources, the amount of data retrieved, which data is retrieved, and activities performed on or with the retrieved data are determined by the SPCDs, based on user parameters, league or contest characteristics, system administrator instructions, other factors, or a combination thereof. In some implementations, data is not altered once received by the SPCDs. Instead, it is retrieved or downloaded and communicated through the network. Some examples of these types of data may be user communications, league or contest statistics and scoring units, or manipulated scoring values (MSVs) determined by the statistical manipulations chosen by users or system administrators.

Figure 3:
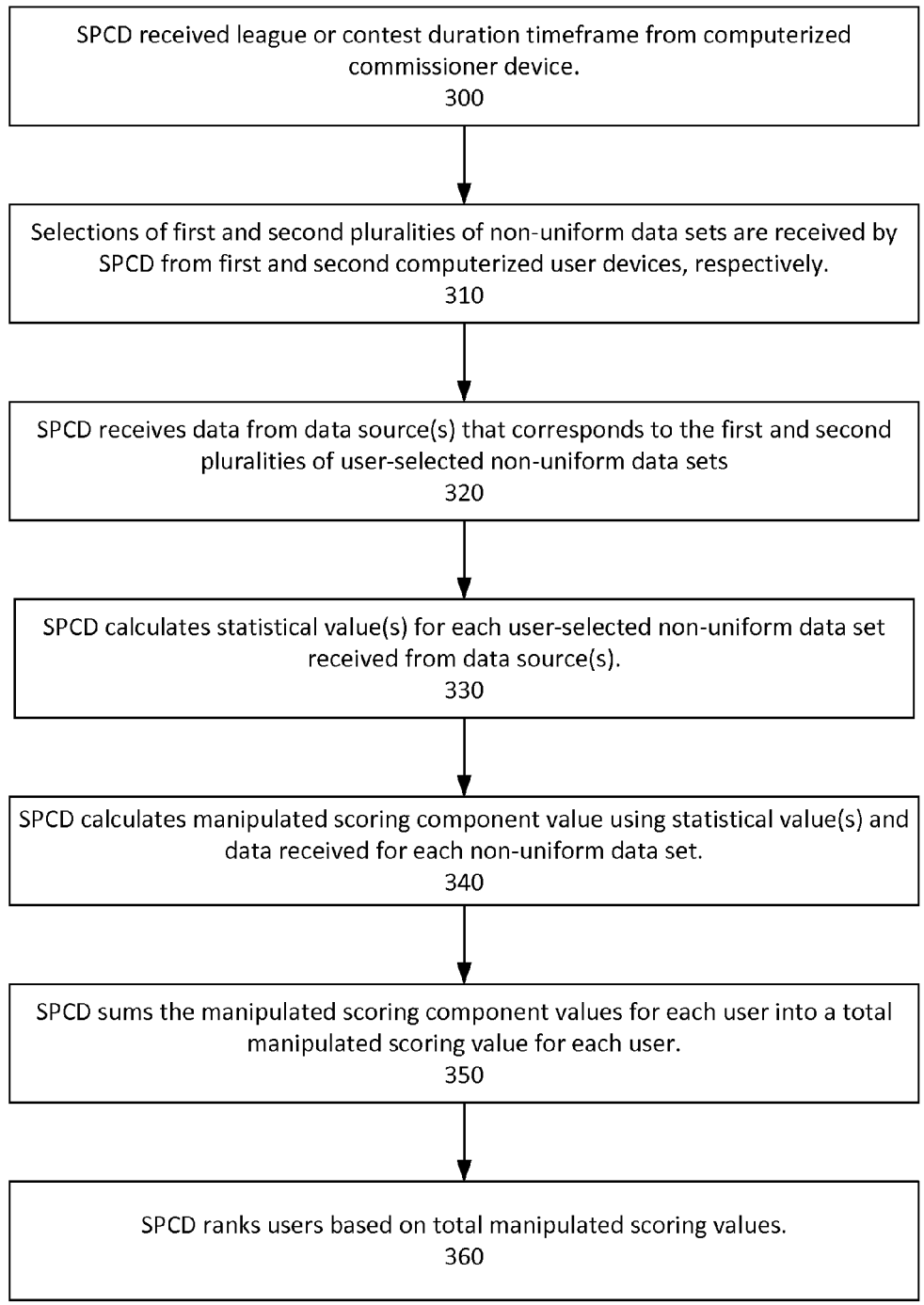
FIG. 3 is a block diagram of an implementation of a method of computerized peer competitive gaming.

As shown in FIG. 3, a user acting as commissioner of the league or contest inputs one or more parameters such as a time duration over which the league or contest is to be conducted using the commissioner's computerized user device which is communicated via the communications network to a computerized processor such as a SPCD 300. Alternatively, a default league or contest setting may be selected by a user. In some implementations, a commissioner or other user may identify which data sets are available for selection by users participating in the league or contest by selecting which teams (players, professionals, famous people, etc.) may comprise a league or contest and may choose parameters for historical data against which current results may be compared.

Two or more users each select one or more data sets, which may be uniform or non-uniform, and these selections are communicated to the SPCD from each of the user's computerized user communication devices 310. The pluralities of data sets chosen by the users may comprise historical data, current data, or data that is to be collected during the duration of the league or contest. Data sets may include raw or statistical data specific to a certain task, ability, result, or compilation of such which results from real-world markets or segments (examples of which include, but are not limited to sports, finance, entertainment, politics, etc.) which may be utilized for the league or contest (e.g. assists in hockey, strokes in golf, blocked shots in basketball, price of a stock, ticket sales of a film, etc.)

The SPCD accesses data that corresponds to the pluralities of user-selected data sets which may comprise historical data or data collected during the duration of the league or contest 320. The data sources may be proprietary and stored on the SPCD or may be remotely accessed via the communications network from a third party and downloaded to the SPCD. The SPCD may then perform one or more processes or calculations to determine one or more statistical values for some or all of the data sets 330. In some implementations, SPCDs may implement user- and/or system administrator-identified parameters to analyze, process, transform and compare the uniform or non-uniform data sets retrieved from data sources by performing one or more statistical manipulations which may be selected by users or system administrators.

To allow users to compete against each other in the league or contest when the data sets selected by users are non-uniform in content or contain non-analogous fields, data collection periods, etc. manipulated scoring values (MSVs) may be used to allow these users to have a common measurement of performance by which they may be ranked relative to their peers. The SPCD calculates an MSV component value for each of the user-selected data sets 340 based on data collected for the user-selected data sets over the league or contest duration.

To calculate MSV component values, data from current games, events, and/or activities that are recorded during the time period, or season, of the league or contest currently being played may be compared historical data among the user-selected non-uniform data sets using one of many user- or system administrator-selected statistical manipulations, including, but not limited to: arithmetic mean-standard deviation, geometric mean-standard deviation, median-standard deviation, mode-standard deviation, arithmetic mean-variance, geometric mean-variance, median-variance, mode-variance, mean-span proportionality, median-span proportionality, mode-span proportionality, and logarithmic statistical comparisons. Activity results may be cumulative or from a designated term. These MSV component values are then summed by the SPCD and result in a total MSV value for each user 350 which may then be used by the SPCD to rank the users relative to each other 360.

In some implementations, cumulative activity results may be calculated from the activity results for each user and accumulated into one final tally over the course of the league or contest before then performing an MSV calculation for all of the accumulated results on the last day of the league. Designated term activity results may be calculated by the user designating a term (e.g. day, week, month, etc.) after which a scoring calculation will be completed, with the final tally of units being done as a summation of the scoring calculation results completed in each term during the league.

In some implementations, users may customize the weight given to component MSVs in an effort to further customize a league or contest. Relative weighting for MSV component values may be determined by a multiplier, additive factor, or other weighting factor selected by the user or by a user acting as league or contest commissioner which may be equal to the arithmetic mean, geometric mean, median, mode, or other chosen statistical tool in the data manipulation methodology choice. This relative weighting allows users to emphasize some categories of activity results over others in the calculations of total MSV's.

One example of user customization may be choosing the league or contest duration which may include the start and end dates and times for a league or contest. Activity results between the start and end dates and times will be used for final scoring calculations in the MSVs.

Additionally, in some implementations of the disclosed system and methods, the composition of historical data sets being analyzed may be selected by users. The composition of these data sub-sets may be customizable by chronology, time period, which data is included or excluded, or any other customization useful for creating a better play experience for users. An example of one such customization may be illustrated using the example of a historical chronological composition of data sets. A user may select the beginning and ending dates for a sub-set of this data set and data collected between those dates may be used to create a statistical or other mathematically computed output value which may then be compared to activity results over the league or contest duration to calculate an MSV component value, weighting, or other result.

The following examples are provided and are merely illustrative of some implementations of the disclosed system and method and embodiments of the data sets, chronological composition of data sets, and statistical manipulation options that may be chosen and are not intended to limit any other embodiments or user customization options.

Example 1

Figure 4:
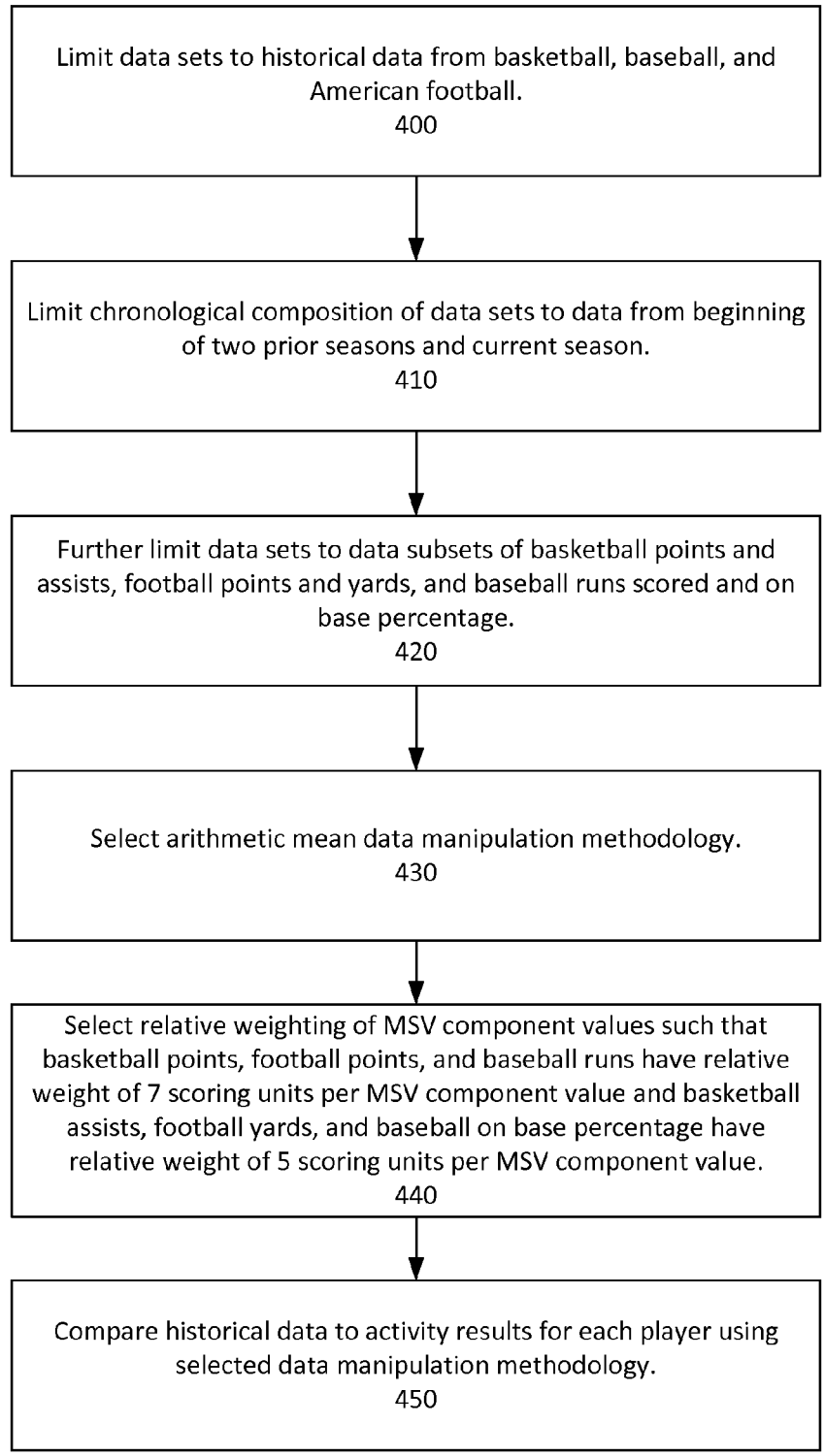
FIGS. 4-5 are block diagrams of examples of implementations of leagues and contests in accordance with implementations of a method of computerized peer competitive gaming.
Figure 5:
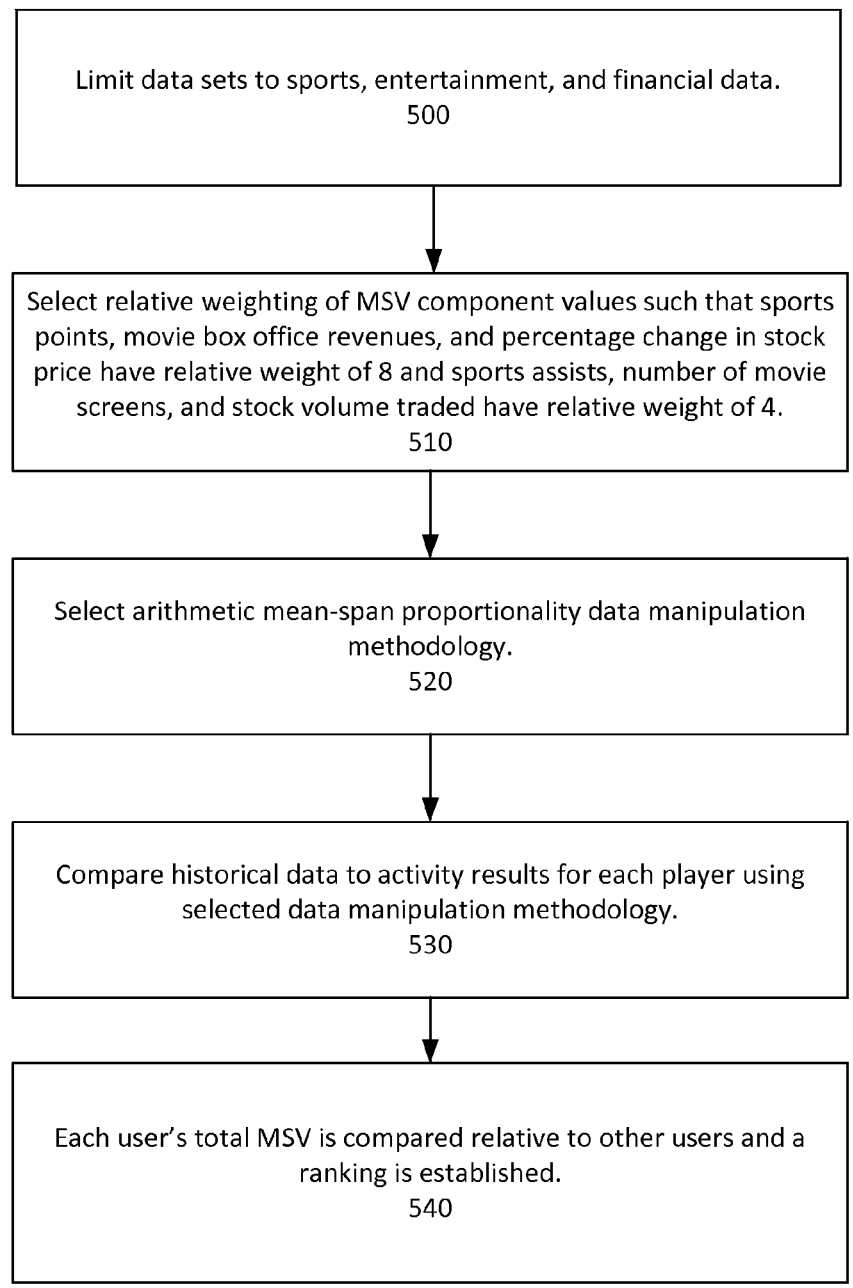

A League Having Multiple Sports and Using an Arithmetic Mean-Standard Deviation Data Manipulation Methodology As illustrated in FIG. 4, User A wishes to create a multi-sport fantasy gaming league for him and nine of his friends. He accesses the SPCDs via a computerized user communication device and chooses the parameters for the league:

He limits the data sets available for use in the league to historical data sets from basketball, baseball, and American football 400.

He selects a historical chronological composition of the data sets to include only data collected from the beginning of the two seasons prior to the current season for each sport and also chooses to include data from the current season in the data sets 410.

He makes final limitations to the identified data sets by choosing points and assists from basketball, points and yards from football, and runs scored and on base percentage from baseball 420. He chooses the arithmetic mean—standard deviation data manipulation methodology 430.

To finish the customization of the league, he also selects a relative weighting of MSV component values for basketball points, football points and baseball runs to carry a relative weight of 7 scoring units, with basketball assists, football yards, and baseball on base percentage carrying a relative weight of 5 scoring units 440.

At the end of the league, the activity results registered during the league's duration from each individual player on each user's team are manipulated and compared to historical data from the user identified data sets 450. Results of the arithmetic means and standard deviations for the historical chronological data sets are as follows:

|  |  | Arithmetic Mean | Standard Deviation |
| --- | --- | --- | --- |
| Basketball | Points | 8.8 | 2.4 |
|  | Assists | 3.5 | 1.5 |
| Football | Points | 2.2 | 1.0 |
|  | Yards | 24.8 | 5.4 |
| Baseball | Runs | 0.4 | 0.3 |
|  | Base Percentage | 0.345 | 0.65 |

Supposing that User A's selection of Basketball Player 1, Football player 2, and Baseball Player 3 results in the following player results at the end of the league:

| User A's Player Results | | |
| --- | --- | --- |
| Basketball Player 1 | Points | 26 |
|  | Assists | 12 |
| Football Player 2 | Points | 10 |
|  | Yards | 88 |
| Baseball Player 3 | Runs | 1 |
|  | Base Percentage | 0.250 |

This results in User A's MSV being calculated as follows:

Player 1: 26 points is 7.2 standard deviations above the arithmetic mean of 8.8. The relative weight of basketball points is 7, so 7.2 points are added to the 7 units associated with a scoring output equal to the arithmetic mean of the historical data set, resulting in a final relatively weighted component MSV of 14.2 units for basketball points. The following shows the calculations used to arrive at this final relatively weighted component MSV:

26 points−8.8 average points=17.2 points 17.2 points/2.4 points std. deviation=7.2 points 7.2 points+7 points relative weight=14.2 units The same calculation for basketball assists results in a relatively weighted component MSV of 10.7 units:

12 assists−3.5 average assists=8.5 assists 8.5 assists/1.5 assists std. deviation=5.7 assists 5.7 assists+5 assists relative weight=10.7 units Thus, the total component MSVs earned by Player 1 for User A is:

14.2+10.7=24.9 units

Player 2: 10 points is 7.8 standard deviations above the arithmetic mean of 2.2. When the standard deviations are added to the relative weight for the data set (7 units for football points), the relatively weighted component MSV for this activity result is 14.8 units. Using a calculation performed in the same manner as above, a relatively weighted component MSV of 16.7 units (11.7 standard deviations+5 relative weighting units) is arrived at. Player 2 therefore earned 31.5 units for User A during the league.

Player 3: 1 run is 2 standard deviations above the arithmetic mean of 0.4, resulting in a baseball runs weighted score of 9 units. The 0.250 on base percentage is 1.5 standard deviations below the historical data set's arithmetic mean, resulting in a baseball on base percentage weighted score of 3.5 units (−1.5 standard deviations+5 relative weighting units). Thus, Player 3 earned 13.5 units for User A during the league.

Player A's team therefore netted a total MSV of 69.9 units during the league. After the corresponding calculations are completed for each of the Players on each user in the league's teams, the MSVs for each user's team are compared to determine a winner of the league, second place, etc.

Example 2

A Contest Using Sports, Entertainment, and Financial Data and an Arithmetic Mean-Span Proportionality Data Manipulation Methodology User A wishes to participate in a contest that allows users to create teams from competitors in the markets of sports, entertainment, and finance. The contest offers a prize of $1000 to the winner and allows up to 130 Users to participate in the contest at a cost of $10 each. User A accesses the SPCDs via a computerized user communication device and enters the information requested by the SPCDs for the contest. This contest's parameters calculate MSVs based on sports data (points and assists data sets), entertainment data (box office revenues and number of screens for newly released movies) and financial data (percentage change in stock price and volume of stock traded) 500. The contest also selects sports points, movie box office revenues and percentage change in stock price to carry a relative weight of 8 MSV component values, with sports assists, number of screens for movies, and stock volumes traded carrying a relative weight of 4,510. User A or the contest commissioner selects an arithmetic mean-span proportionality data manipulation methodology 520. According to this methodology and the selected parameters, for sports points, movie revenues, and stock percentage change, one MSV component value is awarded for every 5% that the span for the selected data set is away from the minimum value of the span. For the other data sets, one MSV component value will be awarded for every 10% of the span the data set is away from the minimum value of the span.

At the end of the contest, the activity results registered during the league's duration from each individual player on each user's team are manipulated and compared to historical data 530. Results show that the span for each historical data set is as follows:

|        |                   | Minimum       | Maximum       |
|--------|-------------------|---------------|---------------|
| Sports | Points            | 0             | 44            |
|        | Assists           | 0             | 13            |
| Movies | Revenues          | $12.4 million | $145.9 million|
|        | Screens           | 10,019        | 158,986       |
| Stocks | Percentage Change | −12.4%        | 67.4%         |
|        | Shares Traded     | 1,835,283     | 29,412,325    |

At the end of the contest, User A's results are as follows:

| User A's Results |                   |               |
|------------------|-------------------|---------------|
| Sports Player    | Points            | 18            |
|                  | Assists           | 5             |
| Movie            | Revenues          | $97.6 million |
|                  | Screens           | 19,904        |
| Stock            | Percentage Change | −0.4%         |
|                  | Shares Traded     | 15,547,980    |

Thus, User A's MSV for the contest is calculated as follows:

Sports Player: The point span is 44. The points result is 18 points away from the minimum value of the span, which is 40.9% of the span. This means that an MSV component value of 8 will be awarded. The following shows the calculations used to arrive at this MSV component value:

18 points−0 points=18 points 18 points/44 point span=40.9% of point span 40.9% point span/5% MSV component value per point span=8 MSV component value A similar calculation for sports assists results in an MSV component value of 4 being awarded (5 assists is 38.5% of the span above the minimum span value) as follows:

5 assists−0 assists=5 assists 5 assists/13 assist span=38.5% of assist span 38.5% assist span/10% MSV component value per assist span=4 MSV component value Thus, User A earned a combined MSV component value of 12 from the sports player during the contest.

Movie: The revenue span is $133.5 million. The revenue result is $85.2 million above the lowest span value, or 63.8% of the span. Thus, performing a calculation similar to that above, an MSV component value of 13 is awarded for movie revenues. A similar calculation arrives at an MSV component value of 1 being awarded (the current result is 9885 screens above the lowest span value, which is 6.6% of the span). Thus, User A earned a combined MSV component value of 14 from the movie during the league.

Stock: The percentage change span is 79.8%. The current percentage change result is 12.8% above the lowest span value, or 16.0% of the span. This results in an MSV component value of 3 being awarded for stock percentage change based on a calculation similar to that above. A similar calculation arrives at an MSV component value of 5 being awarded for stock volume traded (the current result is 13,712,697 shares above the lowest span value, which is 49.7% of the span). Thus, User A earned a combined MSV component value of 8 from stock during the league.

After summing the MSV component values, Player A's team netted a total MSV of 34 during the contest. After the corresponding calculations were completed for the team for each user in the contest, the MSVs for each user's team are compared to determine a winner of the league, second place, etc. 540. The prize is awarded accordingly.

In places where the description above refers to particular implementations of computerized systems and methods for peer comparative gaming, it should be readily apparent that a number of modifications may be made without departing from the spirit thereof and that these implementations may be applied to other embodiments of peer competitive gaming systems and methods.

I claim:

1. A computerized method of peer competitive gaming comprising:
    receiving, by a processor, a league duration timeframe from a computerized commissioner device;
    receiving by the processor, a selection of a first plurality of non-uniform data sets from a first computerized user device and a second plurality of non-uniform data sets from a second computerized user device;
    receiving, by the processor, data corresponding to the first and second pluralities of user-selected non-uniform data sets from one or more computerized data sources, at least a portion of the data being collected by the one or more computerized data sources during the league duration timeframe;
    calculating, by the processor, one or more statistical values for each user-selected non-uniform data set received from the one or more computerized data sources;
    calculating, by the processor, a manipulated scoring component value using the one or more statistical values and the data received from the one or more computerized data sources for each user-selected non-uniform data set;
    summing, by the processor, the calculated manipulated scoring component values for each user to form a total manipulated scoring value for each user;
    ranking, by the processor, the total manipulated scoring values for the first and second users relative to each other to determine a user ranking within the league;
    displaying the user ranking of at least one of the first and second users on the first and second computerized user devices; and
    displaying a winner notification on the computerized user device of the user having a highest user ranking within the league.

2. The method of claim 1, wherein at least one non-uniform data set among the first and second pluralities of non-uniform data sets comprises historical data.

3. The method of claim 1, wherein at least one non-uniform data set among the first and second pluralities of non-uniform data sets comprises data collected in real time over the league duration timeframe.

4. The method of claim 1, further comprising:
    receiving by the processor, a weighting factor corresponding to at least one calculated manipulated scoring component value; and
    summing the calculated manipulated scoring component values after applying weighting factor to the calculated manipulated scoring component value.

5. The method of claim 4, wherein the weighting factor is received from the first or the second user device.

6. The method of claim 4, wherein the weighting factor is based on a total number of manipulated scoring value components designated as active by the first or second user.

7. The method of claim 4, wherein the weighting factor is received from the first or the second user device.

8. The method of claim 4, wherein the weighting factor is based on a total number of manipulated scoring value components designated as active by the first or second user.

9. The method of claim 1, wherein at least one of the non-uniform data sets among the first and second pluralities of non-uniform data sets comprises data relating to at least one of a sports player's performance, a sports team's performance, sales data, entertainment data, political data, and financial market data.

10. The method of claim 1, wherein the one or more statistical values comprise a mean and a standard deviation.

11. The method of claim 1, wherein the one or more statistical values comprise a mean and a span between a maximum and minimum value for a non-uniform data set.

12. The method of claim 1, further comprising receiving by the processor a type of statistical manipulation from the computerized commissioner device.

13. A system for computerized peer competitive gaming comprising:
    a computerized commissioner device configured to transmit a league duration timeframe to a processor;
    a first computerized user device configured to transmit a selection of a first plurality of non-uniform data sets to the processor; and
    a second computerized user device configured to transmit a second plurality of non-uniform data sets to the processor;
    wherein the processor is configured to:
        receive data corresponding to the first and second pluralities of user-selected non-uniform data sets from one or more computerized data sources, at least a portion of the data being collected by the one or more computerized data sources during the league duration timeframe;
        calculate one or more statistical values for each user-selected non-uniform data set received from the one or more computerized data sources;
        calculate a manipulated scoring component value using the one or more statistical values and the data received from the one or more computerized data sources for each user-selected non-uniform data set;
        sum the calculated manipulated scoring component values for each user to form a total manipulated scoring value for each user; and
        rank the total manipulated scoring values for the first and second users relative to each other to determine a user ranking within the league, wherein
    the first and second computerized user devices are further configured to receive and display the user ranking of at least one of the first and second users and displaying a winner notification on the computerized user device of the user having a highest user ranking within the league.

14. The system of claim 13, wherein at least one non-uniform data set among the first and second pluralities of non-uniform data sets comprises historical data.

15. The system of claim 13, wherein at least one non-uniform data set among the first and second pluralities of non-uniform data sets comprises data collected in real-time over the league duration timeframe.

16. The system of claim 13, wherein the processor is further configured to:
    receive a weighting factor corresponding to at least one calculated manipulated scoring component value; and
    sum the calculated manipulated scoring component values after applying the weighting factor to the calculated manipulated scoring component.

17. The system of claim 13, wherein at least one of the non-uniform data sets among the first and second pluralities of non-uniform data sets comprises data relating to at least one of a sports player's performance, a sports team's performance, sales data, entertainment data, political data, and financial market data.

18. The system of claim 13, wherein the one or more statistical values comprise a mean and a standard deviation.

19. The method of claim 13, wherein the one or more statistical values comprise a mean and a span between a maximum and minimum value for a non-uniform data set.

20. The method of claim 13, wherein a type of statistical manipulation is received from the computerized commissioner device.

\* \* \* \* \*